April 1, 1930.   R. JELINEK   1,752,952
DISPLAY DEVICE
Filed Oct. 4, 1928   2 Sheets-Sheet 1

INVENTOR
Rudolph Jelinek
BY Henry Blech
ATTORNEY

April 1, 1930.  R. JELINEK  1,752,952
DISPLAY DEVICE
Filed Oct. 4, 1928  2 Sheets-Sheet 2

INVENTOR
Rudolph Jelinek
BY Henry Plech
ATTORNEY

Patented Apr. 1, 1930

1,752,952

UNITED STATES PATENT OFFICE

RUDOLPH JELINEK, OF CHICAGO, ILLINOIS

DISPLAY DEVICE

Application filed October 4, 1928. Serial No. 310,282.

The invention relates to toys and more particularly to a device for displaying pictures.

It is an object of the invention to provide a device whereby a plurality of picture carriers may be successively placed in position for display.

A further object aims at providing a device in which a stack of pictures may be successively placed in visible position and thereafter again displayed, however, in inverse order.

A still further object constitutes the provision of a device which is of extremely simple construction and yet very efficient for the purposes for which it is assigned.

It is also an object of the invention to utilize a film having a series of pictures and cut up into sections which sections are arranged in stack formation in the device for the purpose of display.

With these and other equally important objects in view, the invention comprises the means hereinafter described in the specification, particularly pointed out in the claims forming a part thereof, and illustrated in the accompanying drawing, in which:

Figure 1:
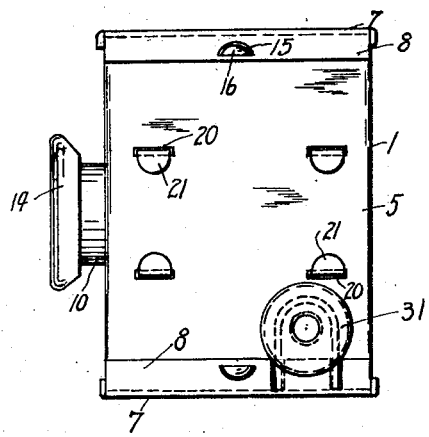
Figure 1 is a side view of a device constructed in accordance with my invention.
Figure 2:
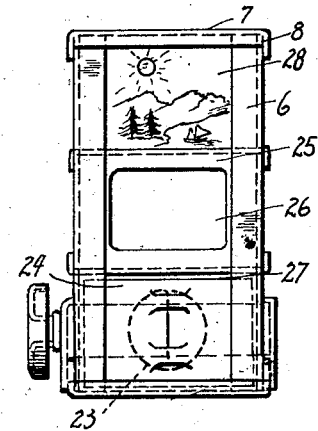
Fig. 2 is a rear view of the device.
Figure 4:
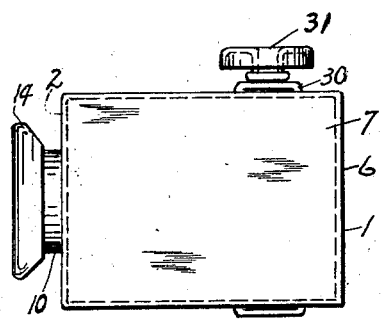
Fig. 4 is a top plan view of the device.
Figure 3:
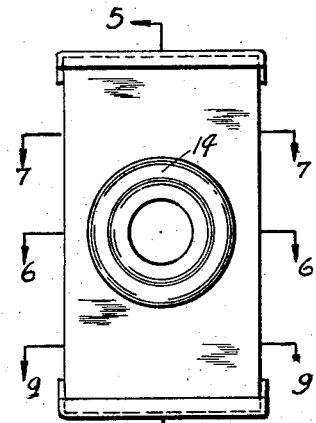
Fig. 3 is a front view of the device.
Figure 6:
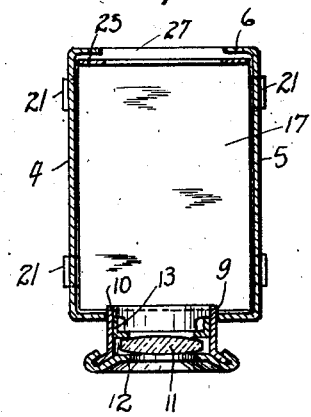
Fig. 6 is a section on the line 6—6 of Fig. 3.
Figure 8:
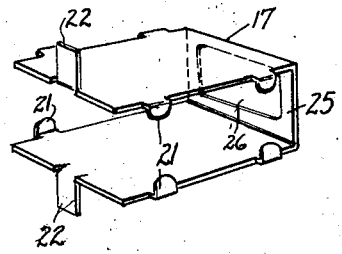
Fig. 8 is a perspective view of a detail.
Figure 7:
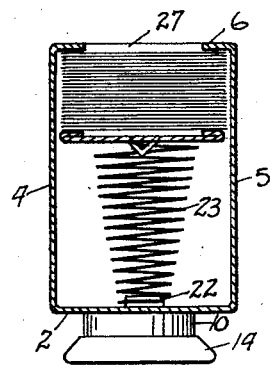
Fig. 7 is a section on the line 7—7 of Fig. 3.
Figure 9:
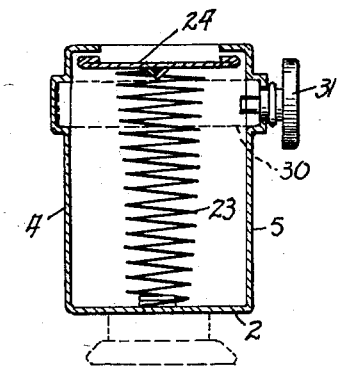
Fig. 9 is a horizontal section on the line 9—9 of Fig. 3.
Figure 5:
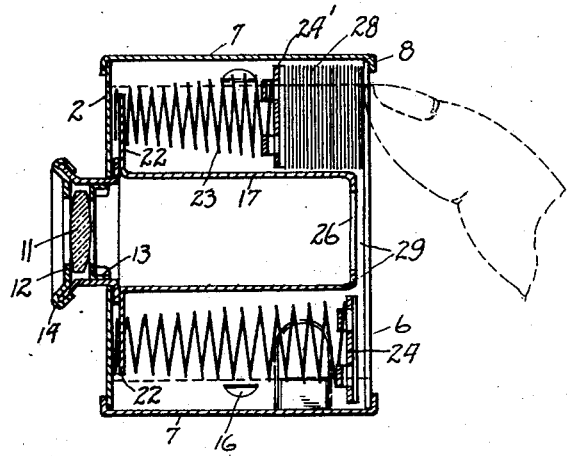
Fig. 5 is a section on the line 5—5 of Fig. 3.
Figure 10:
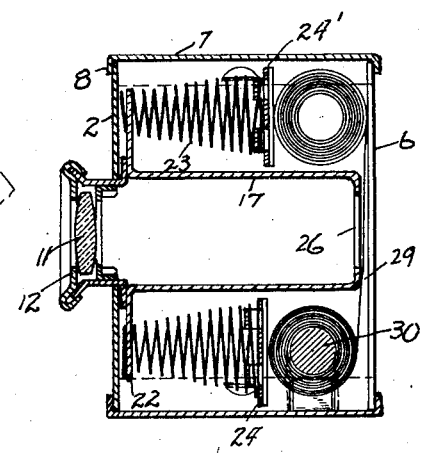
Fig. 10 is a vertical section of a modification.

Referring to the several views of the drawing, 1 designates a box of rectangular cross-section open at the bottom and top and having the front 2, sides 4 and 5, and the back 6. The bottom and the top of the box is normally closed by a cover plate 7 which has a flange 8 at the right angles thereto and encompassing the marginal portion of the sides of the box.

The center of the box is formed with an aperture 9 to receive a short tube 10 in which is arranged a lens 11 held between an annular flange 12 of the tube and a retainer member 13. A bead 14 encompassing the outer end of the tube 10 constitutes an ornamental finish.

The covers are formed in their flanges 8 with openings 15 to receive tongues 16 stamped out from the box. A U-shaped plate 17 fits in the box and divides the same in the upper compartment 18 and the lower compartment 19.

The sides of the box are provided with slots 20 through which are inserted ears 21 projecting from the longitudinal edges of the plate 17. These ears are subsequently bent to engage the outside of the box so as to hold the plate 17 in position. The plate 17 also has vertical lugs 22.

To the lugs 22 are attached one end of push springs 23, the other ends of which are secured to followers 24 and 24'.

The connecting portion 25 of the plate 17 is formed with rectangular opening 26 and the back 6 of the box has an opening 27 extending almost the entire height of the box. A stack of pictures 28 is arranged between the follower 24 and the back 6 of the box and are resiliently held against the back opening 27.

In use a finger is slightly pressed against a picture carrier 28 through the opening 27 and thereafter such end picture is forced or slid downwardly through the passage 29 defined by the back 6 and the portion 26 of the plate 17 which parts are slightly spaced from each other. The picture carrier when occupying a position in registry with the opening 26 may be viewed through the lens 11. Thereafter the picture carrier is slid downwardly into the compartment 19 and is held by the follower 24'. To display the next picture carrier the same operation is performed. Similarly all of the picture carriers may be shifted from the upper into the lower compartment.

If desired the picture carriers after being stacked in the lower compartment may be shifted upwardly into the upper compartment but of course, they will be displayed in inverse order.

The device is particularly useful in connection with films having a series of pictures. The film is cut up into sections, so that the sections may be arranged in the upper compartment and in the aforedescribed manner displayed and subsequently arranged in the lower compartment.

In order to permit display of a continuous film a roller 30 is provided in the lower compartment and is equipped with a knob 31 on the protruding end. The film is wound on the roller from the reel stored in the upper compartment after being threaded through the passage.

While the drawing discloses a preferred embodiment of the invention various changes and alterations may be made within the spirit of the invention. I, therefore, do not limit myself to the details of construction as shown but wish to include all changes, alterations, and variations constituting departures within the scope of the invention as defined in the appended claims.

I claim—

1. A device of the character described, comprising a casing, a plurality of compartments in said casing, a package connecting said compartments, one compartment containing a stack of pictures, means for permitting access to the end picture for manual removal of said end picture through said passage to the other compartment, and means for holding a picture in said passage in display position, said compartments holding the pictures in identical stack formation but in inverse order.

2. In a device for exhibiting pictures, a casing, a U-shaped member in said casing and defining therewith an upper compartment containing a plurality of picture carriers in stack formation, a lower compartment to store said carriers in stack formation but in inverse order than in said upper compartment, and a passage connecting said compartments, said passage being formed to permit display of pictures.

In witness whereof I affix my signature.

RUDOLPH JELINEK.